(12) United States Patent
Jo (10) Patent No.: US 12,237,932 B2
(45) Date of Patent: Feb. 25, 2025

(54) STORAGE DEVICE FOR TRANSMITTING FRAME SEQUENCE NUMBER AND CREDIT INFORMATION FASTER, AND METHOD OF OPERATING THE SAME

(71) Applicant: SK hynix Inc., Icheon (KR)

(72) Inventor: Woon Yong Jo, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 18/317,701

(22) Filed: May 15, 2023

(65) Prior Publication Data

US 2024/0214131 A1 Jun. 27, 2024

(30) Foreign Application Priority Data

Dec. 22, 2022 (KR) .................. 10-2022-0181243

(51) Int. Cl.
*H04L 1/18* (2023.01)
*H04L 1/00* (2006.01)
*H04L 1/1829* (2023.01)
*H04L 5/00* (2006.01)

(52) U.S. Cl.
CPC .......... *H04L 1/1864* (2013.01); *H04L 1/1835* (2013.01)

(58) Field of Classification Search
CPC ... H04L 1/1864; H04L 1/1835; H04L 47/127; H04L 5/0055; H04L 47/34; H04L 47/18; H04L 43/0882; H04L 47/30
See application file for complete search history.

(56) References Cited

U.S. PATENT DOCUMENTS

| | | | | |
|---|---|---|---|---|
| 8,111,623 | B2 * | 2/2012 | Balandin | H04L 47/10 370/236 |
| 10,135,710 | B2 * | 11/2018 | Kanou | H04L 47/127 |
| 11,740,834 | B2 * | 8/2023 | Choi | G06F 3/0659 711/103 |
| 11,811,897 | B2 * | 11/2023 | Lin | H04L 69/324 |
| 2013/0262892 | A1 | 10/2013 | Radulescu | |
| 2017/0264519 | A1 * | 9/2017 | Kanou | H04L 5/0055 |
| 2021/0103393 | A1 | 4/2021 | Abhani et al. | |
| 2023/0377618 | A1 * | 11/2023 | Lin | G11C 7/1093 |

* cited by examiner

*Primary Examiner* — Justin R Knapp (57) ABSTRACT

A storage device may execute a function of a data link layer among a plurality of communication layers of Unified protocol (UniPro), obtain a frame sequence number indicating a sequence of a first frame from the first frame before storing the first frame received from an external device into a reception buffer, and add the frame sequence number to a second frame.

10 Claims, 11 Drawing Sheets

STORAGE DEVICE FOR TRANSMITTING FRAME SEQUENCE NUMBER AND CREDIT INFORMATION FASTER, AND METHOD OF OPERATING THE SAME

CROSS-REFERENCES TO RELATED APPLICATION

The present application claims priority under 35 U.S.C. 119(a) to Korean patent application number 10-2022-0181243 filed on Dec. 22, 2022, which are incorporated herein by reference in its entirety.

BACKGROUND

1. Technical Field

Various embodiments generally relate to a storage device that transmits a frame sequence number and credit information faster, and a method of operating the storage device.

2. Related Art

A Universal Flash Storage (UFS) device, which is a type of storage device, may execute communication with another UFS device (e.g., a UFS host) using Unified protocol (UniPro). The UniPro is a protocol proposed by Mobile Industry Processor Interface (MIPI) Alliance for communication between UFS devices.

The UniPro may have a multi-layer structure including a plurality of communication layers. Among the plurality of communication layers, a data link layer is a layer that controls frame transmission and reception, and the data link layer may perform error detection and retransmission of a frame.

SUMMARY

Various embodiments are directed to a storage device capable of rapidly acknowledging, to an external device, a frame sequence number and credit information for a frame received from the external device, and to a method of operating the storage device.

In an embodiment, a storage device may include: i) a reception circuit configured to receive a first frame from an external device, ii) a transmission circuit configured to transmit a second frame to the external device, and iii) a controller configured to execute a function of a data link layer among a plurality of communication layers of Unified protocol (UniPro). In this case, the controller is configured to obtain a frame sequence number indicating a sequence of the first frame from the first frame before storing the first frame in a reception buffer, and add the frame sequence number to the second frame.

In an embodiment, a method of operating a storage device may include: i) receiving a first frame from an external device through a data link layer among a plurality of communication layers of Unified Protocol (UniPro), ii) obtaining a frame sequence number indicating a sequence of the first frame, before storing the first frame in a reception buffer, iii) generating a second frame including the frame sequence number, and iv) transmitting the second frame to the external device through the data link layer According to the embodiments of the disclosure, it is possible to rapidly acknowledge, to the external device, the frame sequence number and the credit information for the frame received from the external device.

DETAIL DESCRIPTION OF THE EXEMPLARY EMBODIMENTS

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

Figure 1:
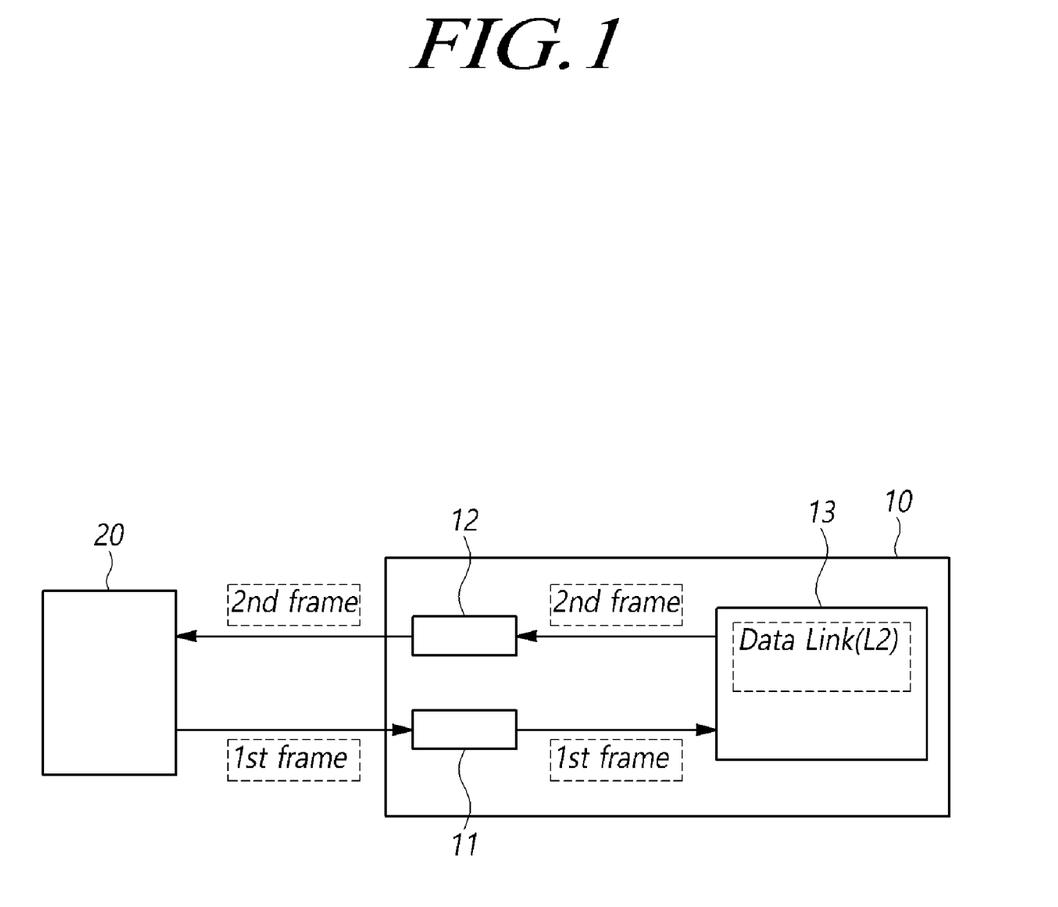
FIG. 1 illustrates a storage device according to an embodiment of the disclosure.

FIG. 1 illustrates a storage device 10 according to an embodiment of the disclosure.

Referring to FIG. 1, the storage device 10 may include a reception circuit 11, a transmission circuit 12, and a controller 13. In this case, the storage device 10 may be a UFS device.

The reception circuit 11 may receive a first frame from an external device 20. The first frame may be transmitted to the reception circuit 11 in the form of an electrical signal from the external device 20.

The transmission circuit 12 may transmit a second frame to the external device 20. The second frame may be transmitted to the external device 20 in the form of an electrical signal.

The controller 13 may execute a function of a data link layer, which is an L2 layer, among a plurality of communication layers of UniPro.

The controller 13 may receive the first frame from the reception circuit 11. The first frame in the form of the electrical signal received by the reception circuit 11 may be converted into the first frame in the form of a signal processable in the storage device 10 by the reception circuit 11. And the controller 13 may transmit the second frame in the form of a signal processable in the storage device 10 to the transmission circuit 12. The transmission circuit 12 may convert the second frame from the controller 13 into the second frame in the form of the electrical signal and transmit the electrical signal to the external device 20. The reception circuit 11 and the transmission circuit 12 may communicate with the external device 20 according to an interface defined in UFS specification.

For example, the controller 13 may include a processor and a volatile memory (e.g., SRAM, DRAM, SDRAM, or the like) for executing the function of the data link layer. The controller 13 may load firmware, which defines operations required to execute the function of the data link layer, from a non-volatile memory (e.g., ROM, NAND flash, or the like) external to the controller 13 to the volatile memory, and read the loaded firmware through the use of the processor to execute operations necessary to execute the function of the data link layer.

The processor may use one or more processing cores to execute the operations necessary to execute the function of the data link layer.

Hereinafter, the UniPro including the plurality of communication layers will be described in detail with reference to FIG. 2.

Figure 2:
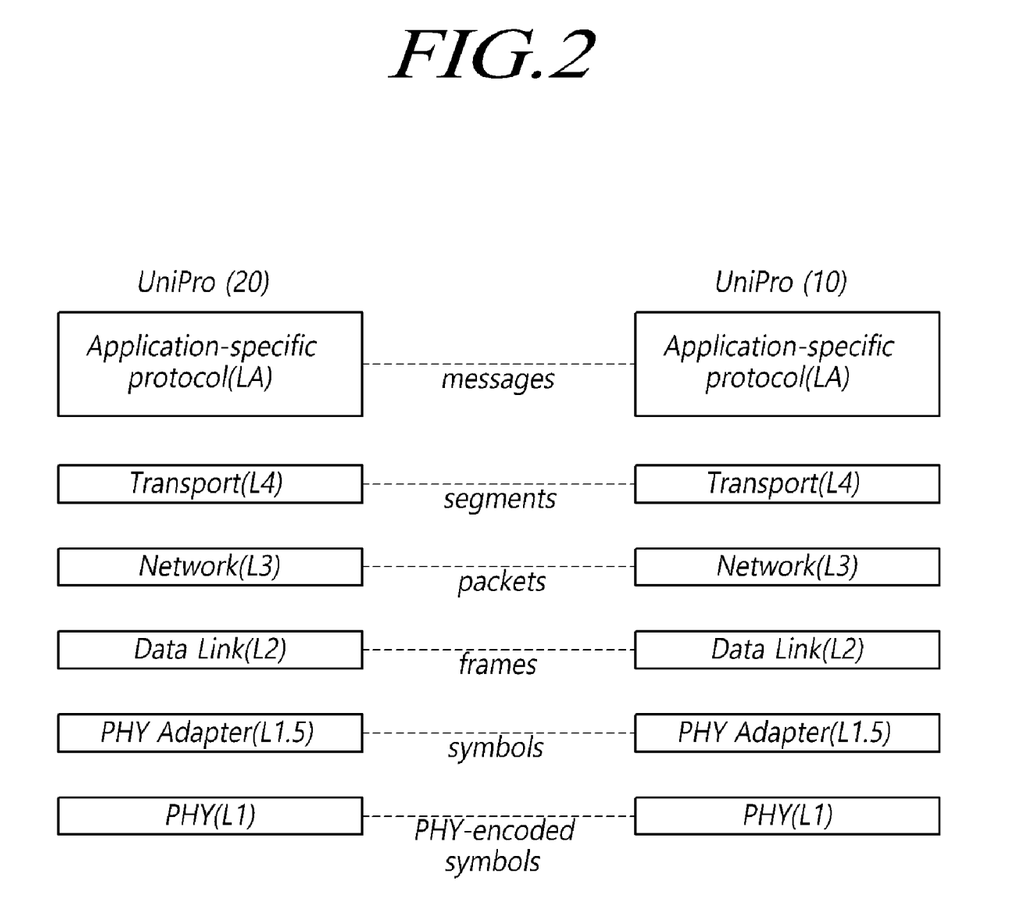
FIG. 2 illustrates communication layers of UniPro according to an embodiment of the disclosure.

FIG. 2 illustrates the plurality of communication layers of the UniPro according to an embodiment of the disclosure.

Referring to FIG. 2, the plurality of communication layers included in the UniPro may be as follows.

The UniPro may include a physical (PHY) layer, which is an L1 layer. Physical layers of the storage device 10 and the external device 20 may exchange encoded symbols with each other according to a specific physical format.

In addition, the UniPro may include a physical (PHY) adapter layer, which is an L1.5 layer. A physical adapter layer is a layer that performs conversion between a physical layer and a data link layer. Physical adapter layers of the storage device 10 and the external device 20 may exchange symbols with each other.

In addition, the UniPro may include a data link layer, which is an L2 layer. Data link layers of the storage device 10 and the external device 20 may exchange frames with each other.

In addition, the UniPro may include a network layer, which is an L3 layer. Network layers of the storage device 10 and the external device 20 may exchange packets with each other.

In addition, the UniPro may include a transport layer, which is an L4 layer. Transport layers of the storage device 10 and the external device 20 may exchange segments with each other.

In addition, the UniPro may further include an application-specific protocol layer, which is an LA layer. Application-specific protocol layers of the storage device 10 and the external device 20 may exchange messages with each other based on protocols defined for each application.

Figure 3:
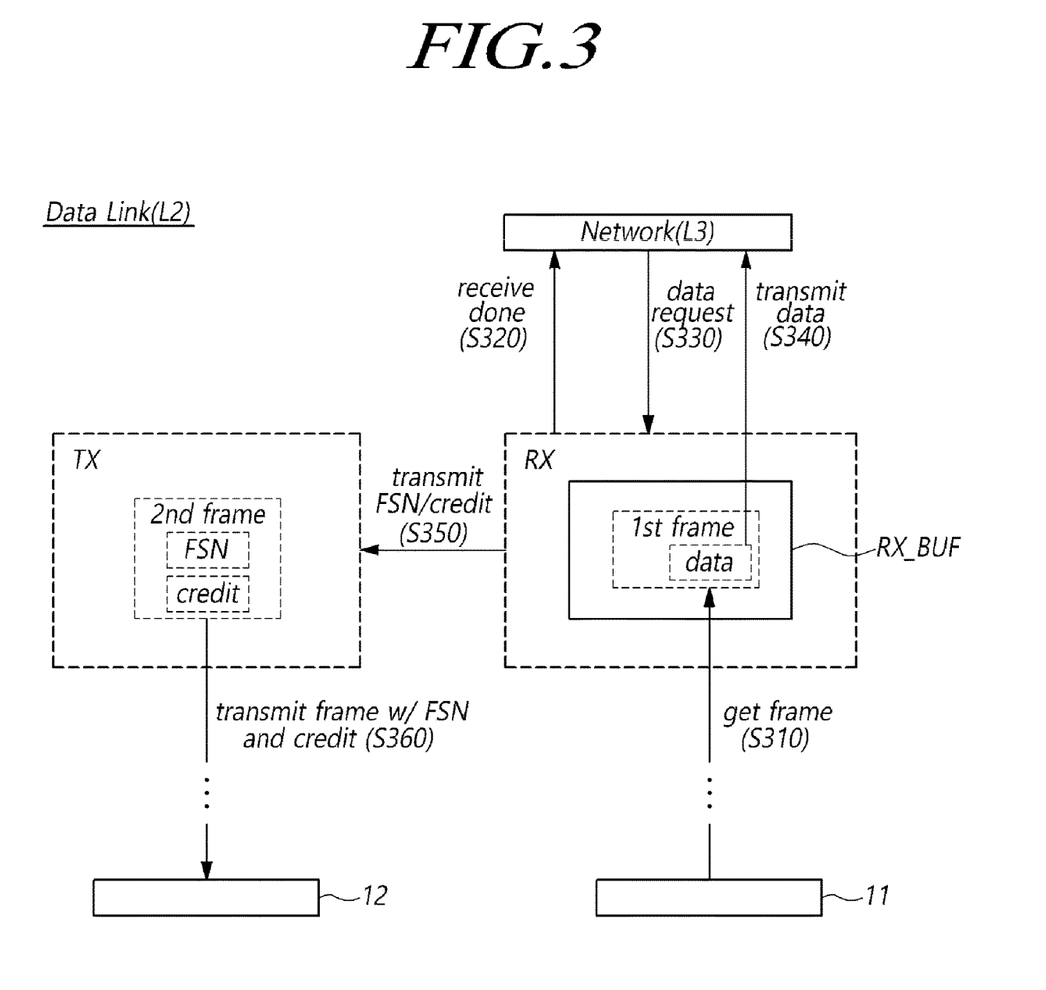
FIG. 3 illustrates an operation of a data link layer according to an embodiment of the disclosure.

FIG. 3 illustrates an operation of a data link layer (L2) according to an embodiment of the disclosure. The operation of FIG. 3 may be performed by the storage device 10 illustrated in FIG. 1, and thus will be described with reference to FIG. 1.

In FIG. 3, in order to execute a function of the data link layer, the controller 13 may execute a reception function module RX and a transmission function module TX of the data link layer. The reception function module RX processes an operation of receiving a frame from a lower layer among the plurality of communication layers of the UniPro, and the transmission function module TX processes an operation of transmitting a frame to the lower layer.

The reception function module RX and the transmission function module TX may be a hardware module or a software module used by the controller 13 of the storage device 10 to execute the function of the data link layer. For example, the reception function module RX and the transmission function module TX may be different processes or threads running on the same hardware module, e.g., a common processor or core. As another example, the reception function module RX and the transmission function module TX may be different processes or threads running on different hardware modules.

Referring to FIG. 3, the reception function module RX of the data link layer may obtain a first frame received by the reception circuit 11 (S310). The reception circuit 11 may receive the first frame in the form of an electrical signal, and transmit the first frame in the form of a signal processable in the storage device 10 to the reception function module RX through one or more communication layers (e.g., physical layer, physical adapter layer) of the UniPro.

The first frame transmitted to the reception function module RX may be stored in a reception buffer RX_BUF of the reception function module RX.

The reception buffer RX_BUF is a space for temporarily storing data included in a frame to be transmitted to an upper layer of the data link layer (e.g., a network layer (L3)) among the plurality of communication layers of the UniPro, and the reception buffer RX_BUF may be set on a volatile/non-volatile memory (not shown) included in the controller 13. In another embodiment, the reception buffer RX_BUF may be set on a volatile/non-volatile memory separated from the controller 13.

After the first frame is stored in the reception buffer RX_BUF, the reception function module RX may transmit information indicating that the first frame has been received to the network layer that is the upper layer of the data link layer (S320).

After that, the network layer may receive data included in the first frame through a handshake with the data link layer. The data included in the first frame may be referred to as a payload.

The network layer may send a data request to the reception function module RX to receive the data included in the first frame (S330). After receiving the data request from the network layer, the reception function module RX may transmit the data included in the first frame to the network layer (S340). In this case, transmitting the data included in the first frame to the network layer may be expressed as fetching the data included in the first frame to the network layer.

At this time, the operations S330 and S340 may be executed through a port (not shown) that is an interface for communication between the data link layer and the network layer.

Thereafter, the reception function module RX may transmit a frame sequence number FSN and credit information of the first frame to the transmission function module TX (S350).

The frame sequence number FSN is a value indicating a sequence of the first frame. The reception function module RX may obtain the frame sequence number FSN from the first frame.

The credit information is a value indicating the size of an available space of the reception buffer RX_BUF. After the data included in the first frame stored in the reception buffer RX_BUF is transferred to the upper layer, i.e., the network layer, the first frame may be deleted from the reception buffer RX_BUF. At this time, the size of the available space of the reception buffer RX_BUF may be changed and thus the credit information may be updated.

The transmission function module TX may generate a second frame including the frame sequence number FSN and the credit information after receiving the frame sequence number FSN and the credit information from the reception function module RX. The controller 13 of the storage device 10 may acknowledge to the external device 20 that the storage device 10 has received the first frame using the frame sequence number FSN included in the second frame, and transmit an available space state of the reception buffer RX_BUF to the external device 20 using the credit information included in the second frame.

The transmission function module TX may transfer the second frame to the transmission circuit 12 (S360). The second frame may be transferred to the transmission circuit 12 described in FIG. 1 via one or more communication layers (e.g., physical layer, physical adapter layer) of the UniPro.

The transmission circuit 12 may convert the second frame into an electrical signal and transmit the electrical signal to the external device 20.

Figure 4:
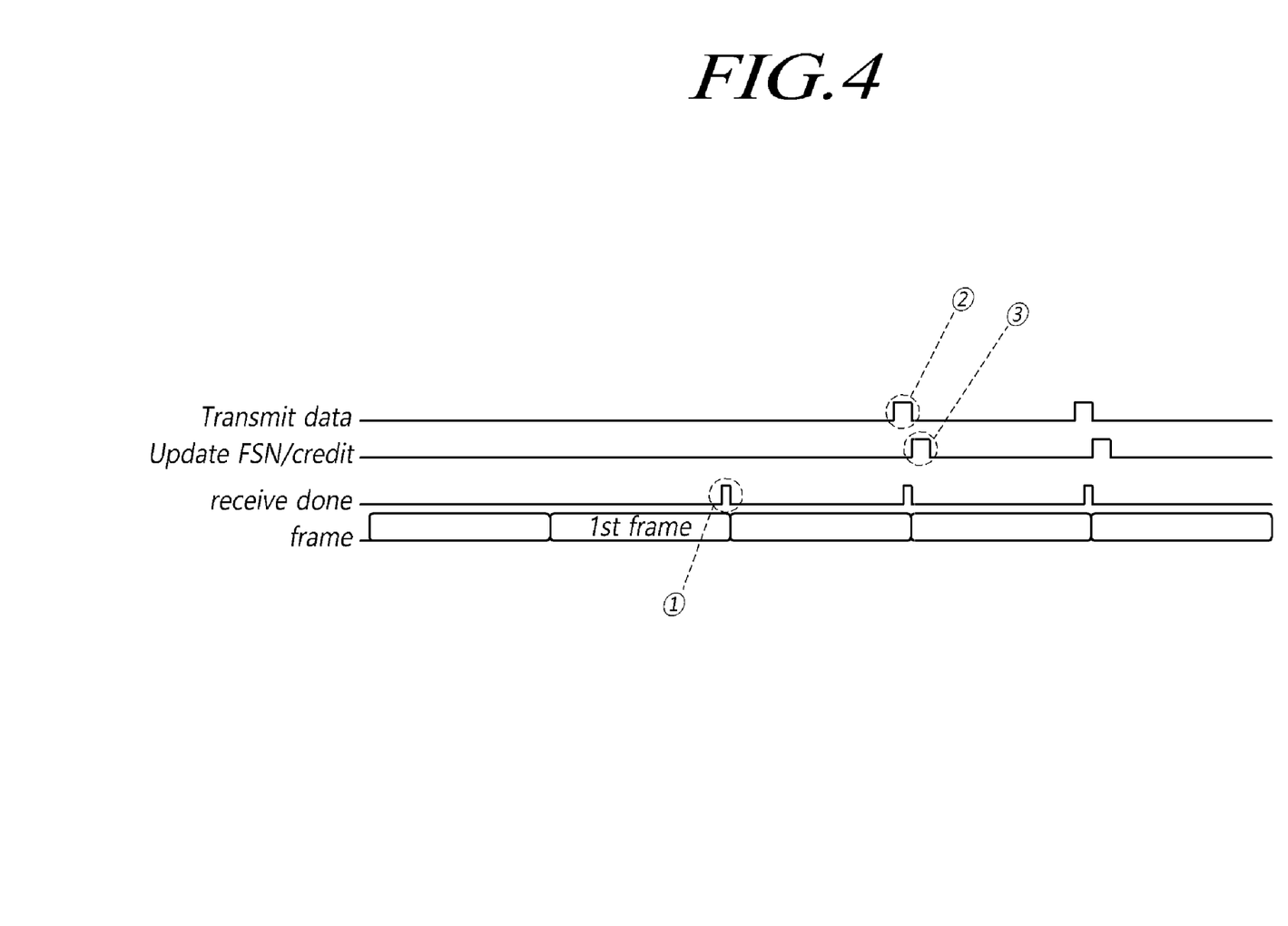
FIG. 4 illustrates an operation of the data link layer described in FIG. 3 according to the lapse of time.

FIG. 4 illustrates an operation of the data link layer described in FIG. 3 according to the lapse of time.

Referring to FIG. 4, after receiving the first frame, the data link layer may generate a signal indicating that reception of the first frame is completed (①).

In this case, it takes a time until the data link layer completes the operation of transmitting the data included in the first frame to the network layer, which is the upper layer of the data link layer, after the data link layer receives the first frame (②). The frame sequence number FSN and the credit information may be updated (③) after the operation of transmitting the data included in the first frame to the network layer is completed.

After that, the frame sequence number FSN and the credit information may be transmitted from the reception function module RX to the transmission function module TX of the data link layer.

Figure 5:
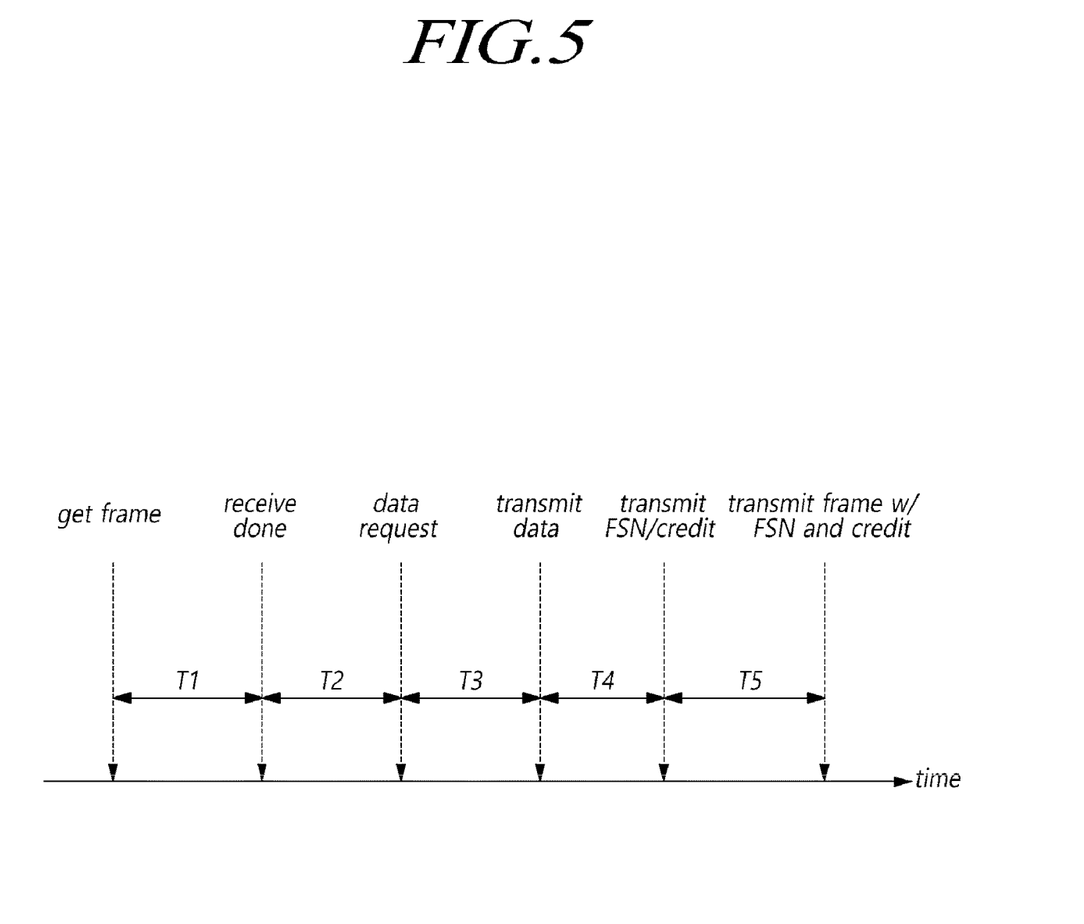
FIG. 5 illustrates a time required for the operation of the data link layer described in FIG. 3.

FIG. 5 illustrates a time required for the operation of the data link layer described in FIG. 3.

Referring to FIG. 5, after the reception function module RX of the data link layer receives the first frame from the reception circuit 11, a total time required to transmit the data included in the first frame to the network layer, to generate the second frame including the frame sequence number FSN and the credit information by the transmission function module TX of the data link layer, and to transmit the second frame through the transmission circuit 12 is T1+T2+T3+T4+T5. Herein, T1 represents a time taken from starting to receive the first frame from the reception circuit 11 to the completion of receiving the first frame; T2 represents a time taken from the completion of receiving the first frame to receiving the data request from the network layer; T3 represents a time taken from receiving the data request from the network layer to transmitting the data to the network layer; T4 represents a time taken from transmitting the data to the network layer to transmitting the frame sequence number FSN and the credit information to the transmission function module TX; and T5 represents a time taken from transmitting the frame sequence number FSN and the credit information to the transmission function module TX to transmitting the second frame through the transmission circuit 12.

In the embodiments described with reference to FIGS. 3 to 5, the frame sequence number FSN and the credit information may be transmitted to the external device 20 through the transmission circuit 12 after data transmission to the network layer is completed.

Hereinafter, an embodiment in which the frame sequence number FSN and the credit information are more quickly transmitted to the external device 20 will be described.

Figure 6:
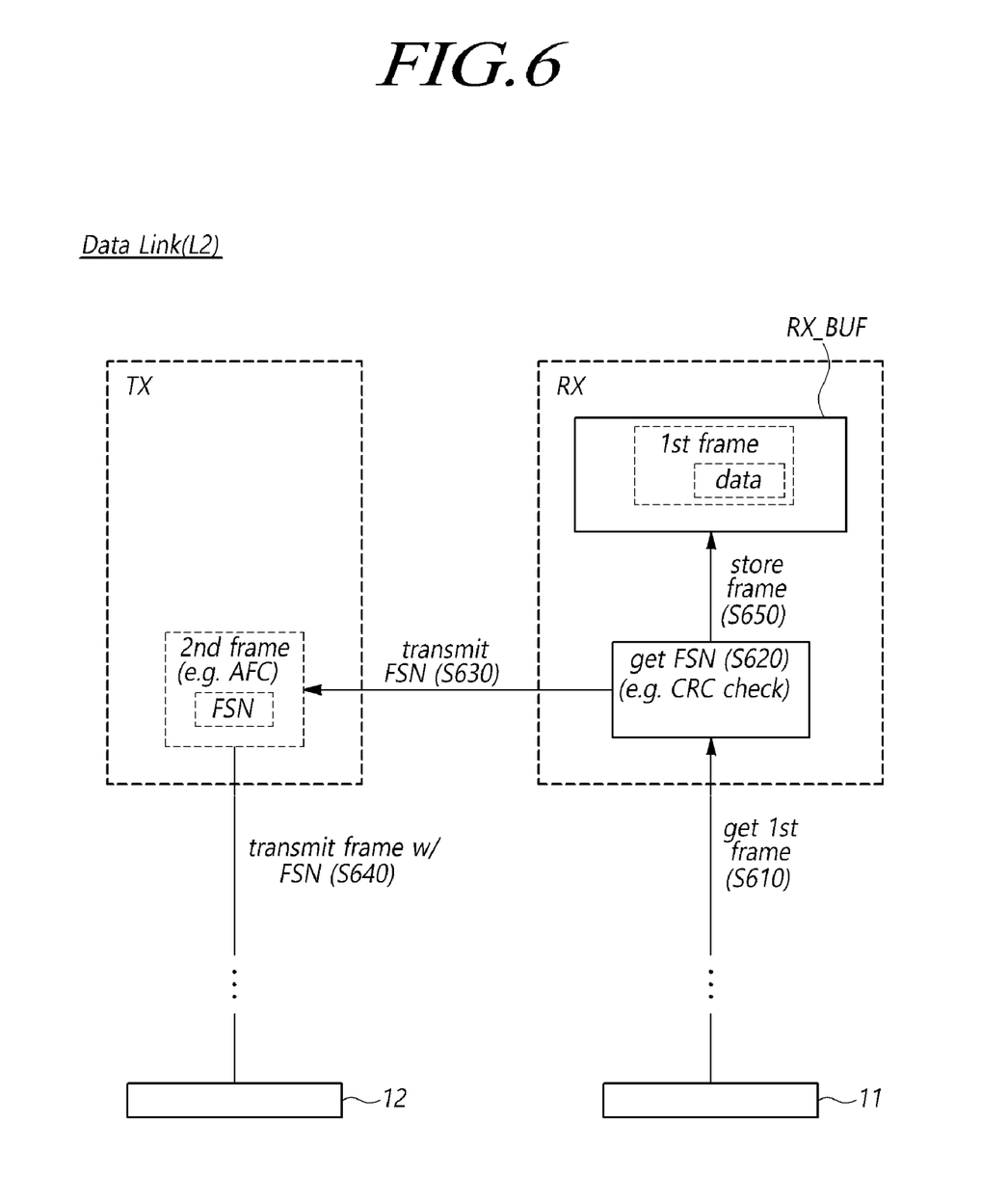
FIGS. 6 and 7 illustrate operations of the data link layer according to embodiments of the disclosure.
Figure 7:
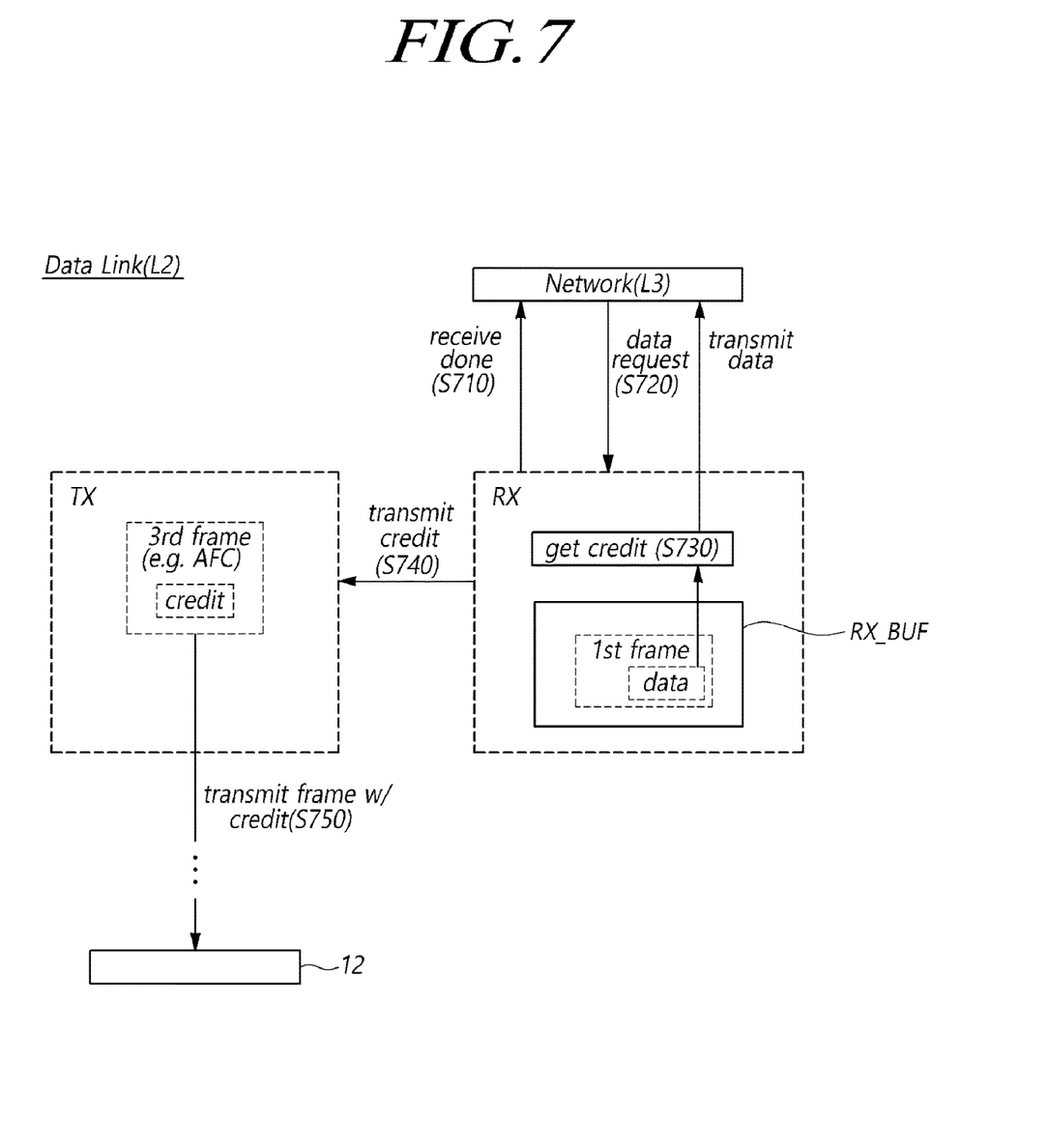

FIGS. 6 and 7 illustrate operations of a data link layer (L2) according to other embodiments of the disclosure.

FIG. 6 illustrates an operation in which the data link layer generates and transmits a second frame.

Referring to FIG. 6, a reception function module RX of the data link layer may receive a first frame from a reception circuit 11 (S610). This is the same as the operation S310 described in FIG. 3.

Before storing the first frame in a reception buffer RX_BUF, the reception function module RX may first obtain a frame sequence number FSN indicating a sequence of the first frame (S620).

For example, the reception function module RX may execute error checking, e.g., a cyclic redundancy check (CRC), on the first frame before storing the first frame in the reception buffer RX_BUF. The CRC for the first frame is included in the first frame. The reception function module RX may obtain the frame sequence number FSN from the first frame when executing the CRC succeeds.

The reception function module RX may transmit the obtained frame sequence number FSN to the transmission function module TX (S630). The transmission function module TX may generate the second frame and add the frame sequence number FSN to the second frame.

In this case, the second frame may be an Acknowledgement and Flow Control (AFC) frame. The AFC frame is a frame used for flow control between the external device 20 and the storage device 10 on the data link layer.

In FIG. 6, the frame sequence number FSN is transferred to the transmission function module TX before storing the first frame in the reception buffer RX_BUF. Accordingly, the second frame including the frame sequence number FSN can be generated faster than in the embodiment described with reference to FIG. 3.

The transmission function module TX may transfer the second frame to the transmission circuit 12 (S640). As described in FIG. 1, the second frame transferred to the transmission circuit 12 may be converted into an electrical signal and transmitted to the external device 20.

Meanwhile, the reception function module RX may store the first frame in the reception buffer RX_BUF after obtaining the frame sequence number FSN in the operation S620 (S650). In this case, the operation S650 may be executed after the operations S630 and S640 are executed, or may be executed in parallel with the operations S630 and S640.

FIG. 7 illustrates an operation in which the data link layer generates and transmits a third frame.

Referring to FIG. 7, the reception function module RX may transfer, to the network layer, information indicating that the first frame has been received (S710). Thereafter, the network layer may request data included in the first frame to the reception function module RX (S720).

When transmitting (or fetching) the data included in the first frame to the network layer, the reception function module RX may generate credit information (S730).

Then, the reception function module RX may transmit the credit information to the transmission function module TX (S740). In the embodiment described with reference to FIG. 3, the credit information is transferred to the transmission function module TX after the data included in the first frame is transmitted to the network layer. But, in the embodiment described with reference to FIG. 7, the credit information may be transferred to the transmission function module TX while the data included in the first frame is transmitted to the network layer.

The transmission function module TX may generate the third frame including the credit information. In this case, the third frame may be an Acknowledgement and Flow Control (AFC) frame.

The transmission function module TX may transfer the third frame to the transmission circuit 12 (S750). The third frame transferred to the transmission circuit 12 may be converted into an electrical signal and transmitted to the external device 20.

Figure 8:
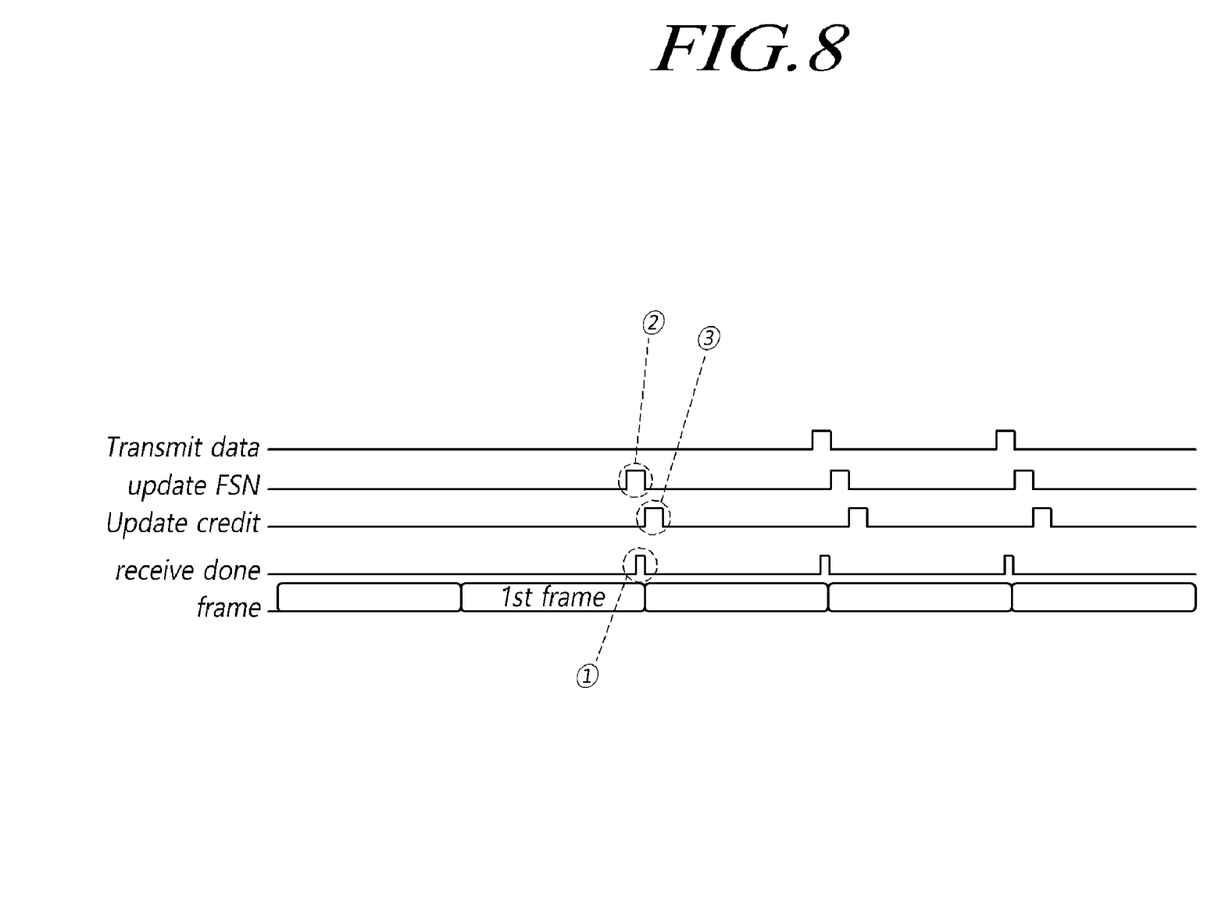
FIG. 8 illustrates an operation of the data link layer described in FIGS. 6 and 7 according to the lapse of time.

FIG. 8 illustrates an operation of the data link layer described in FIGS. 6 and 7 according to the lapse of time.

Referring to FIG. 8, after receiving the first frame, the data link layer may generate a signal indicating that reception of the first frame is completed (①). Subsequently, the frame sequence number FSN may be updated (②), and the credit information may be updated (③).

Compared with FIG. 4, the data link layer may update the frame sequence number FSN and the credit information before completing the operation of transmitting the data included in the first frame to the network layer.

Figure 9:
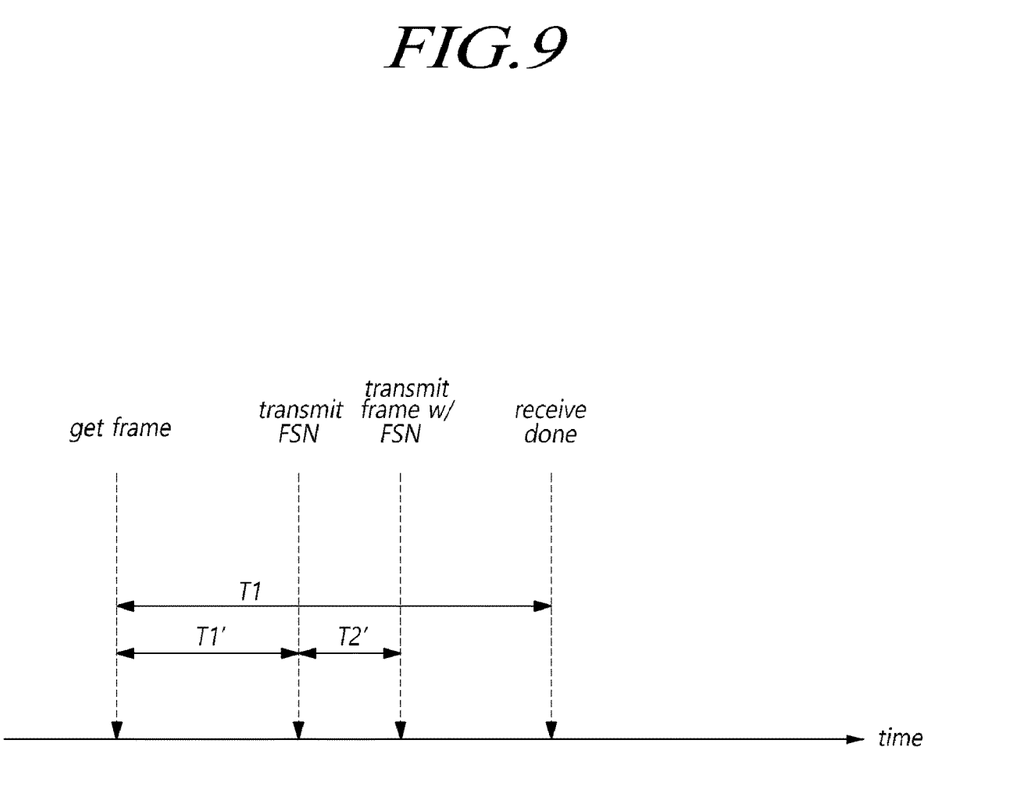
FIG. 9 illustrates a time required for the operation of the data link layer described in FIG. 6.

FIG. 9 illustrates a time required for the operation of the data link layer described in FIG. 6.

Referring to FIG. 9, a time T1'+T2' required to obtain the frame sequence number FSN after the reception function module RX of the data link layer receives the first frame from the reception circuit 11 and to transfer the second frame to the transmission circuit 12 after adding the frame sequence number FSN to the second frame is shorter than a time T1 required for the reception function module RX of the data link layer to complete receiving the first frame from the reception circuit T1. Therefore, compared to the embodiment described in FIG. 5, in the embodiment described in FIG. 6, the frame sequence number FSN can be transmitted to the transmission circuit 12 more quickly.

Figure 10:
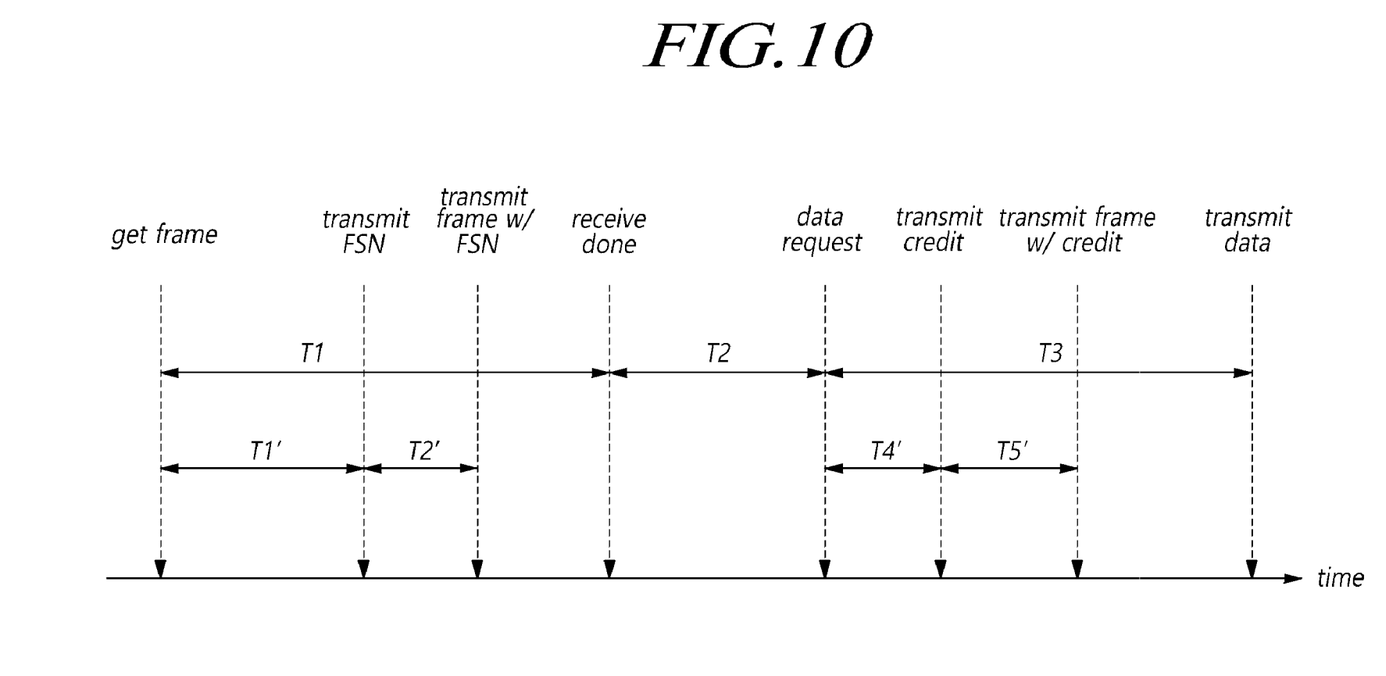
FIG. 10 illustrates a time required for the operation of the data link layer described in FIG. 7.

FIG. 10 illustrates a time required for the operation of the data link layer described in FIG. 7.

Referring to FIG. 10, a time T4'+T5' required for the reception function module RX of the data link layer to create the credit information after receiving the data request from the network layer and to transfer the third frame to the transmission circuit 12 after adding the credit information to the third frame is shorter than a time T3 required for the reception function module RX of the data link layer to transfer (or fetch) the data included in the first frame to the network layer. Therefore, compared to the embodiment described in FIG. 5, in the embodiment described in FIG. 7, the credit information can be transmitted to the transmission circuit 12 more quickly. In FIG. 10, a time T2 represents a time taken from completing the reception of the first frame from the reception circuit T1 to receiving the data request from the network layer.

Figure 11:
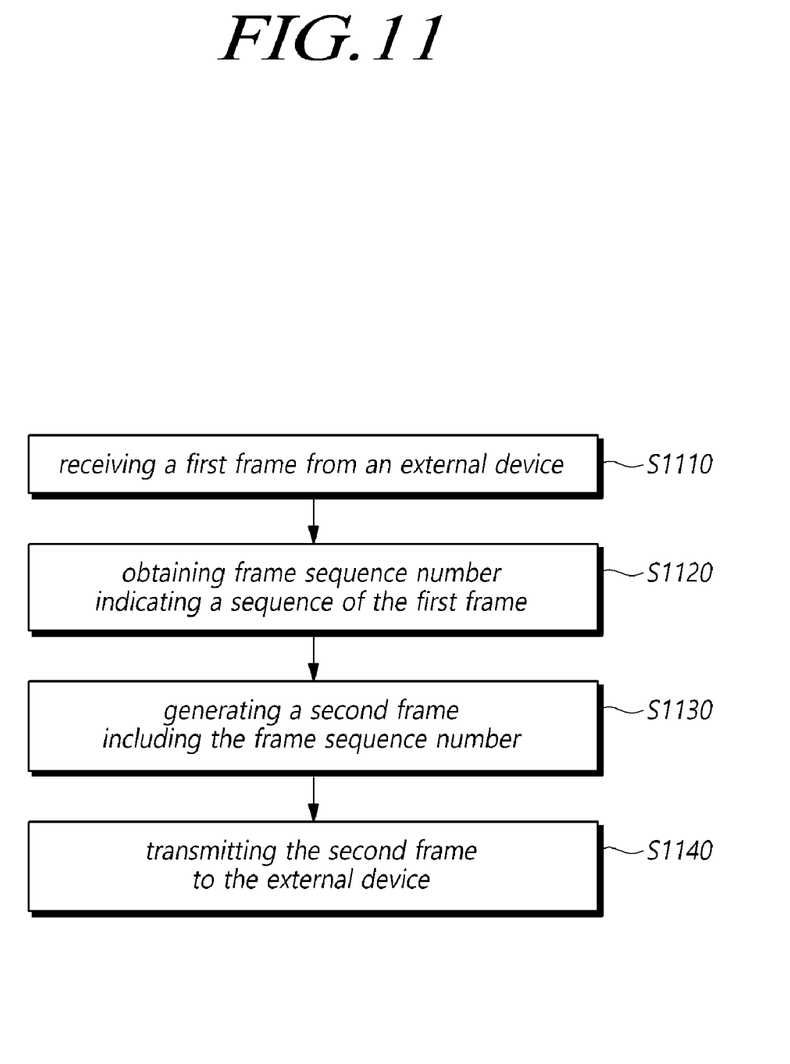
FIG. 11 illustrates a method of operating a storage device according to an embodiment of the disclosure.

FIG. 11 illustrates a method of operating a storage device 10 according to an embodiment of the disclosure. The storage device 10 of FIG. 11 may correspond to the storage device 10 of FIG. 1.

Referring to FIG. 11, the method of operating the storage device 10 may include receiving a first frame from the external device 20 through a data link layer among a plurality of communication layers of UniPro (S1110).

And the method may include obtaining a frame sequence number indicating a sequence of the first frame before storing the first frame in a reception buffer (S1120).

And the method may include generating a second frame including the frame sequence number (S1130).

In this case, the operation S1130 may generate the second frame when a CRC on data included in the first frame succeeds. The second frame may be an Acknowledgement and Flow Control (AFC) frame.

And the method may include transmitting the second frame to the external device 20 through the data link layer (S1140).

Meanwhile, the method of operating the storage device 10 may further include generating credit information indicating the size of an available space of the reception buffer after storing the first frame in the reception buffer; generating a third frame including the credit information; and transmitting the third frame to the external device 20 through the data link layer.

In this case, the generating of the third frame may generate the third frame when the data included in the first frame is fetched to a network layer that is an upper layer of the data link layer after the first frame is stored in the reception buffer. The third frame may be an Acknowledgement and Flow Control (AFC) frame.

Although the embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
a reception circuit configured to receive a first frame from an external device;
a transmission circuit configured to transmit a second frame to the external device; and
a controller configured to execute a function of a data link layer among a plurality of communication layers of Unified protocol (UniPro),
wherein the controller is configured to obtain a frame sequence number indicating a sequence of the first frame from the first frame before storing the first frame in a reception buffer, and
wherein the controller is configured to execute a cyclic redundancy check (CRC) on the first frame before storing the first frame in the reception buffer, and add the frame sequence number to the second frame when the CRC succeeds.

2. The storage device according to claim 1,
wherein the second frame is an Acknowledgement and Flow Control (AFC) frame.

3. The storage device according to claim 1,
wherein the controller is configured to generate credit information indicating a size of an available space of the reception buffer after storing the first frame in the reception buffer, and add the credit information to a third frame, and
wherein the transmission circuit is configured to transmit the third frame to the external device.

4. The storage device according to claim 3,
wherein the controller is configured to generate the credit information when data included in the first frame is transmitted to a network layer, which is the next layer above the data link layer, among the plurality of communication layers after the first frame is stored in the reception buffer.

5. The storage device according to claim 3,
wherein the third frame is an Acknowledgement and Flow Control (AFC) frame.

6. A method of operating a storage device, the method comprising:
receiving a first frame from an external device through a data link layer among a plurality of communication layers of Unified protocol (UniPro);
obtaining a frame sequence number indicating a sequence of the first frame before storing the first frame in a reception buffer;
generating a second frame; and
transmitting the second frame to the external device through the data link layer,
wherein the generating of the second frame includes generating the second frame that includes the frame sequence number when a cyclic redundancy check (CRC) on the first frame succeeds.

7. The method according to claim 6,
wherein the second frame is an Acknowledgement and Flow Control (AFC) frame.

8. The method according to claim 6, further comprising:
generating credit information indicating a size of an available space of the reception buffer after storing the first frame in the reception buffer;
generating a third frame including the credit information; and
transmitting the third frame to the external device through the data link layer.

9. The method according to claim 8,
wherein the generating of the third frame includes generating the third frame that includes the credit information when data included in the first frame is transmitted to a network layer, which is the next layer above the data link layer, among the plurality of communication layers after the first frame is stored in the reception buffer.

10. The method according to claim 9,
wherein the third frame is an Acknowledgement and Flow Control (AFC) frame.

* * * * *